United States Patent
Patil et al.

(10) Patent No.: US 7,987,325 B1
(45) Date of Patent: Jul. 26, 2011

(54) METHOD AND APPARATUS FOR IMPLEMENTING A STORAGE LIFECYCLE BASED ON A HIERARCHY OF STORAGE DESTINATIONS

(75) Inventors: Deepak M. Patil, Roseville, MN (US); Claudia L. Rudolph, Medina, MN (US)

(73) Assignee: Symantec Operation, Mountain View, CA (US)

( * ) Notice: Subject to any disclaimer, the term of this patent is extended or adjusted under 35 U.S.C. 154(b) by 505 days.

(21) Appl. No.: 12/135,779

(22) Filed: Jun. 9, 2008

(51) Int. Cl.
*G06F 12/00* (2006.01)

(52) U.S. Cl. .......................................... 711/161; 711/162

(58) Field of Classification Search .................. 711/162, 711/161
See application file for complete search history.

(56) References Cited

U.S. PATENT DOCUMENTS 7,069,401 B1 *  6/2006  Noonan et al. ................ 711/162
2009/0216796 A1 *  8/2009  Slik et al. .................. 707/103 R

* cited by examiner

*Primary Examiner* — Mardochee Chery
(74) *Attorney, Agent, or Firm* — Campbell Stephenson LLP

(57) ABSTRACT

A method and apparatus for implementing a storage lifecycle policy based on a hierarchy of storage destinations to improve storage lifecycle management is described. In one embodiment, the method comprises specifying at least one source copy for at least one storage lifecycle operation in a storage lifecycle policy to generate a storage destination hierarchy using the at least one specified source copy and performing the at least one storage lifecycle operation using the storage destination hierarchy.

20 Claims, 3 Drawing Sheets

METHOD AND APPARATUS FOR IMPLEMENTING A STORAGE LIFECYCLE BASED ON A HIERARCHY OF STORAGE DESTINATIONS

BACKGROUND OF THE INVENTION

1. Field of the Invention

Embodiments of the present invention generally relate to a data protection systems and, more particularly, to a method and apparatus for implementing a storage lifecycle policy based on a hierarchy of storage destinations for backup image copies to improve storage lifecycle management.

2. Description of the Related Art

A typical enterprise (e.g., a small business, a government organization and/or large corporation) may accumulate a large amount of computer data. Employees and various entities use the computer data in order to perform one or more respective duties for the typical enterprise. If the computer data becomes corrupted, lost, damaged or otherwise unavailable, the performance of the one or more respective duties becomes impossible and/or delayed. Furthermore, overall productivity of the typical organization becomes significantly hindered. Moreover, customers pay the typical organization to use a portion of the computer data to perform various functions. Similarly, if the computer data became unavailable, the customers cannot complete the various functions and become frustrated. Accordingly, the typical organization loses actual and/or potential revenue streams due to the loss of the computer data.

Hence, the typical enterprise may implement a data storage backup and restore solution (e.g., VERITAS NetBackup) for recovering the computer data after an event where the computer data becomes unavailable (e.g., a disaster, a damaged disk, a corrupted file and/or the like). A storage administrator for the typical enterprise may configure a policy (e.g., a storage lifecycle policy) for managing one or more backup images (e.g., tape-based backup images). The policy may define a backup job or duplication job with a storage destination (e.g., a storage unit) and a retention period for the one or more copies of the backup images.

For example, the storage lifecycle policy may direct a backup job (which backs up a portion of the computer data as a backup image) to store the backup image in a storage unit (e.g., a disk drive, a tape drive, a logical storage unit (LUN), a virtual tape library (VTL) and/or the like) with a retention period of three weeks. Subsequently, the storage lifecycle policy may define a duplication job where the backup image is duplicated to another storage unit with a retention period of six months. The storage lifecycle policy may define one or more additional duplication jobs. Lastly, the storage lifecycle policy may define a job where the backup image is archived into a tape library or a disk array.

Conventional storage lifecycle policy management solutions do not efficiently use various computer resources (e.g., network and storage resources) during one or more storage lifecycle operations (e.g., duplication, backup and/or the like). Consequently, a storage device that comprises a primary copy of the backup image also exclusively performs the one or more storage lifecycle operations (e.g., replicating the primary copy to a target copy at a destination storage device or storage destination). Furthermore, current storage lifecycle policies only use a copy of a backup image as a source copy for a storage lifecycle operation if the copy is tagged as "primary". Such a tag is easily modified, which constitutes a risk for each and every copy made from the "primary" copy. As such, a plurality of target copies may have different source copies. Currently, the storage lifecycle policy management solutions do not identify the source copy used in a particular storage lifecycle policy. In addition, the "primary" copy may have been corrupted or infected. Hence, the plurality of target copies may include copies of corrupted or infected data. As a result, the implementation of the storage lifecycle policy is disrupted.

Therefore, there is a need in the art for a method and apparatus for implementing a storage lifecycle policy in a cost-efficient manner based on a hierarchy of storage destinations. The hierarchy of storage destinations may be used by a storage administrator to improve storage lifecycle management of a backup image.

SUMMARY OF THE INVENTION

Embodiments of the present invention generally comprise a method and apparatus for implementing a storage lifecycle policy based on a hierarchy of storage destinations. In one embodiment, a method for using a storage destination hierarchy to manage a storage lifecycle of a backup image comprises specifying at least one source copy for at least one storage lifecycle operation in a storage lifecycle policy to generate a storage destination hierarchy using the at least one specified source copy and performing the at least one storage lifecycle operation using the storage destination hierarchy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
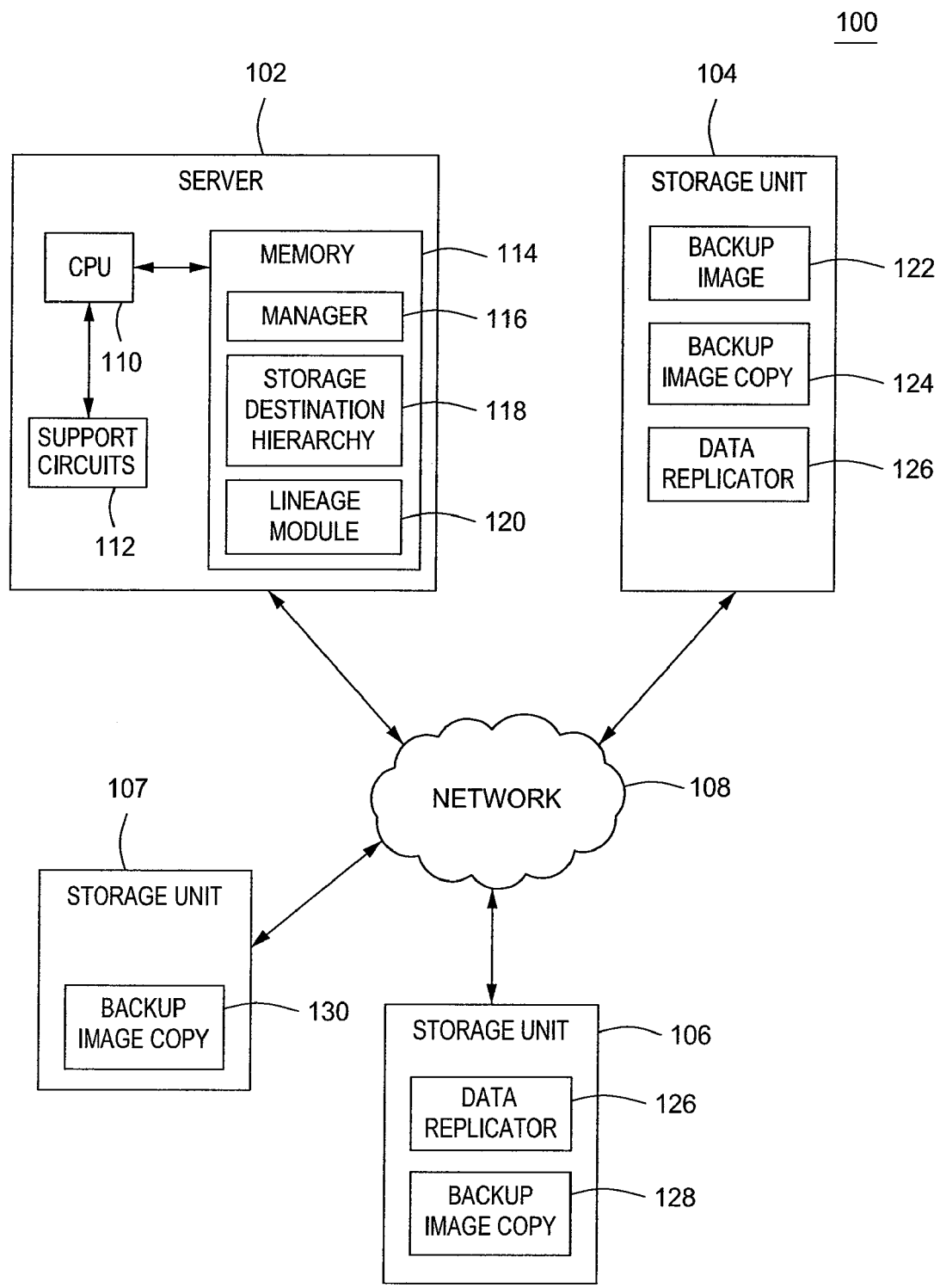
FIG. 1 is a block diagram of a system for managing a storage lifecycle based on a lineage of a backup image copy according to one embodiment.

FIG. 1 is a block diagram of a system 100 for managing a storage lifecycle based on a lineage of a backup image copy according to one embodiment. The system 100 includes a server 102, a storage unit 104, a storage unit 106 and a storage unit 107, each is coupled to each other through a network 108.

The server 102 is a computing device (e.g., a laptop, a desktop, a Personal Desk Assistant (PDA), a tablet, a mobile phone and the like) that comprises a central processing unit (CPU) 110, various support circuits 112 and a memory 114. The CPU 110 may comprise one or more commercially available microprocessors or microcontrollers that facilitate data processing and storage. The various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various software packages, such as a manager 116 and a lineage module 120. The memory 114 further includes various data, such as a storage destination hierarchy 118.

The storage unit 104 includes a portion of a computer data storage device, such as a hard disk drive, a Redundant Array of Inexpensive Disks (RAID)-5 disk array, a virtual tape library (VTL), a magnetic tape drive and/or the like. The storage unit 104 may include a file system directory on a disk or a tape that stores data (e.g., backup data, duplicated data and/or the like). In one embodiment, the storage unit 104 includes a backup image 122 and a backup image copy 124, which is a copy of the backup image 122. Similarly, the storage unit 106 and the storage unit 107 store data (e.g., backup data, duplicated data and/or the like) and include a backup image copy 128 and a backup image copy 130, respectively.

In addition, the storage unit 104 and the storage unit 106 include a data replicator 126 according to one embodiment. Generally, the data replicator 126 is a hardware component of data storage device that performs hardware replication on stored data, such as the backup image copy 124 and may be a portion of an enterprise hardware replication solution (e.g., VERITAS Volume Replicator). In one embodiment, the data replicator 126 performs a replication operation on the backup image copy 124 and creates the backup image copy 128. In another embodiment, replication software performs a replication operation on the backup image copy 128 and creates the backup image copy 130.

The storage unit 104, the storage unit 106 and the storage unity 107 may be located at different or same locations according to various embodiments of the present invention. In one embodiment, the storage unit 104 and the storage unit 106 are at different locations. For example, the storage unit 104 may be a VERITAS NetBackUp storage unit that is coupled to a VERITAS NetBackUp media server in New York and the storage unit 106 may be a VERITAS NetBackUp storage unit that is coupled to a VERITAS NetBackUp media server in San Francisco. In addition, the storage unit 106 and the storage unit 107 may be located within a same area and coupled to the same VERITAS NetBackUp media server in San Francisco. For example, the storage unit 107 may be a magnetic tape drive that operates as an archive for the VERITAS NetBackUp media server in San Francisco. Furthermore, the VERITAS NetBackUp media server in San Francisco and the VERITAS NetBackUp media server in New York may be coupled to a same VERITAS NetBackUp master server (e.g., the server 102).

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. The network 108 may form a portion of a Storage Area Network (SAN) and/or a Local Area Network (LAN).

The manager 116 comprises software code for implementing a storage lifecycle policy that is associated with a backup policy (e.g., a schedule for creating snapshot images and/or backup images). For example, the backup policy may be a VERITAS NetBackUp Policy that defines a schedule for performing various data protection operations on the computer data, such as backup, duplication, restoration and/or the like. Furthermore, the storage lifecycle policy may be a VERITAS NetBackUp Storage Lifecycle Policy that defines a strategy or plan for managing the progression (i.e., staging) of the computer data. In one embodiment, the storage lifecycle policy may indicate a data protection operation (e.g., duplication, backup and/or the like) to be performed on the computer data, a storage destinations for the data protection operation and a retention period for the computer data at the storage destination. The storage destination may be a storage unit, such as the storage unit 104 or any portion of computer data storage that is under the control of the server 102. The retention period may be a period of time in which the computer data is stored at the storage destination. It is appreciated that the storage lifecycle policy may also indicate a plurality of data protection operations to be performed consecutively for which the storage lifecycle policy indicates a plurality of storage destinations and a plurality of retention periods.

The storage destination hierarchy 118 comprises information regarding a hierarchy of storage destinations for one or more storage lifecycle operations (e.g., backup, duplicate and/or the like) as defined by a storage lifecycle policy for the backup image 122. Such information indicates a source copy for each storage lifecycle operation of the one or more storage lifecycle operations. In one embodiment, the storage destination hierarchy 118 includes a mapping between a source copy (e.g., a source copy number) and one or more target copies that are created from the source copy in accordance with the storage lifecycle policy. For example, one or more duplication operations may be performed on the source copy to produce the one or more target copies on one or more storage destinations (e.g., storage units). Therefore, the storage destination hierarchy 118 includes one or more mappings between a storage unit that stores the source copy and one or more storage units that store the one or more target copies.

Additionally, the storage destination hierarchy 118 may be used to determine a provenance or lineage of the one or more target copies according to various embodiments of the present invention. Since the source copy for the one or more target copies is also a target copy for a second source copy, a lineage of the source copy includes the second source copy as an ancestor. Furthermore, the second source copy may also be a target copy for a third source copy and so on. Hence, the lineage of the source copy now includes the third source copy and the second source copy. In one embodiment, each and every copy in the lineage of the source copy (e.g., the third source copy and the second source copy) is an exact replica of the backup image 122 and comprises same data as the source copy. Occasionally, a particular copy in the lineage may comprise data that is different from a source copy of the particular copy. As a result, each and every target copy for the particular copy comprises the data that is different from the source copy. Furthermore, the particular copy in the lineage may become corrupt, tampered and/or malicious. Consequently, each and every target copy for the particular copy may also be corrupt, tampered and/or malicious.

The lineage module 120 comprises software code that is configured to examine the storage destination hierarchy 118 to identify a lineage of a backup image copy according to various embodiments. In one embodiment, the lineage module 120 determines a first source copy for the backup image copy. Furthermore, the lineage module 120 determines a second source copy for the first source copy. Accordingly, the second source copy and the source copy form at least a portion of the lineage of the backup image copy.

According to one or more embodiments, the lineage module 120 examines one or more (source) copies in the lineage of the backup image copy in order to detect a malfunction or a security attack. In one embodiment, the lineage module 120 may determine that a source copy in the lineage includes corrupted data. As described above, corrupted data in any one of the one or more copies indicates that a descendent backup image copy most likely includes the corrupted data as well. Hence, the lineage module 120 may remove the backup image copy from a backup catalog, the storage lifecycle policy and/or the storage destination hierarchy 118 because the backup image copy cannot be used to create an exact and reliable copy of an original backup image.

In another embodiment, the lineage module 120 examines the backup image copy and determines that the backup image copy comprises corrupted data. As such, there is a strong likelihood that the source copy also comprises corrupted data. The lineage module 120 may traverse the storage destination hierarchy 118 and/or the backup catalog to identify the source copy. The lineage module 120 may examine the source copy and confirm the data corruption in the source copy. As a result, the lineage module 120 may remove the corrupted source copy from a backup catalog, the storage lifecycle policy and/or the storage destination hierarchy 118. The corrupted source copy may also be deleted from a host storage unit. Moreover, the lineage module 120 may also remove and/or delete one or more target copies created from the corrupted source copy. In one embodiment, the lineage module 120 examines the storage destination hierarchy 118 to identify the one or more target copies for the corrupted source copy.

The manager 116 and/or the storage administrator cooperate to select a backup image copy to be used as a source copy for a storage lifecycle operation as defined by a storage lifecycle policy according to various embodiments of the present invention. In one embodiment, the manager 116 enables a storage administrator to submit a copy number to indicate the backup image copy as a source copy for a duplication operation. In another embodiment, the manager 116 and the lineage module 120 identify the backup image copy that reduces a load at a primary device (e.g., a storage unit or a media server that performs a duplication operation on a primary copy). For example, the identified backup image copy may require a low (e.g., least) amount of computer resources to perform the storage lifecycle operation. As another example, the backup image copy may be stored in a storage unit having a low (e.g., lowest) load (e.g., a number of storage lifecycle operations to be performed by the storage unit).

In operation, the manager 116 creates a storage lifecycle policy and the storage destination hierarchy 118 for a backup image using information provided by the storage administrator that describes one or more storage lifecycle operations and corresponding storage destinations. In one embodiment, the manager 116 generates the storage destination hierarchy 118 with one or more source copies specified by the storage administrator for the one or more storage lifecycle operations. Subsequently, the manager 116 performs the one or more storage lifecycle operation as indicated in the storage lifecycle policy.

Accordingly, the lineage module 120 examines the storage destination hierarchy 118 and/or the backup catalog and determines a lineage of a particular backup image copy. In one embodiment, the storage administrator selects the particular backup image copy for the lineage determination. In one embodiment, the lineage module 120 examines each and every source copy in the lineage and detects a malfunction and/or a security attack. For example, the particular backup image copy may be corrupted and the lineage module 120 may examine each and every source copy to identify a first corrupted source copy.

In another embodiment, the lineage module 120 examines the storage destination hierarchy 118 to identify one or more backup image copies. Then, the lineage module 120 examines the one or more backup image copies to specify a source copy to be used for the storage lifecycle operation that is to be performed in accordance with the storage lifecycle policy. In yet another embodiment, the lineage module 120 selects the backup image copy that requires a fewest number of network transfer operations to perform the storage lifecycle operation as a source copy.

In one embodiment, the manager 116 determines that the backup image copy 124 is a source copy for a duplication operation that creates the backup image copy 128 as a result. Subsequently, the manager 116 updates the backup catalog to indicate that the backup image copy 124 is the source copy for the backup image copy 128. Furthermore, the manager 116 determines that the backup image copy 128 is a source copy for a duplication operation that creates the backup image 130 as a result. Hence, the manager 116 updates the backup catalog to indicate that the backup image copy 128 is the source copy for the backup image copy 130.

Before a storage lifecycle policy is executed, the manager 116 interacts with the storage administrator to define the storage destination hierarchy 118. In one embodiment, the storage administrator may define the storage destination hierarchy 118 by selecting the backup image copy 128 to be the source copy instead of the backup image copy 124 or the backup image copy 130. For example, the backup image copy 124 may be tagged as a primary copy and thus, used for almost every storage lifecycle operation of a storage lifecycle policy. Hence, the storage unit 104 or a media server that manages the storage unit 104 is heavily loaded with the storage lifecycle operations; whereas, the storage unit 106 may have a lighter load. Moreover, the storage unit 107 may be a tape drive from which the backup image copy 130 may require a significant amount of time to be duplicated. Thus, the storage lifecycle policy may be executed more efficiently (e.g., consume a smaller amount of various computer resources, require a fewer number of network transfer operations and/or the like) if the backup image copy 128 is used as the source copy instead of the backup image copy 124 or the backup image copy 130. Afterwards, the manager 116 may present a graphical representation of the storage destination hierarchy 118 to the storage administrator.

Embodiments of the present invention achieve a reduction in computer resource consumption associated with the performance of one or more storage lifecycle operations on a primary backup image copy. For example, if the storage unit 104 was the primary device that stores the primary backup image copy, the storage unit 104 performs one or more storage lifecycle operations of a storage lifecycle policy even though the storage unit 106 and the storage 107 include copies of the primary backup image copy. Thus, the storage unit 106 and/or the storage unit 107 perform some of the one or more storage lifecycle operations to reduce the load on the storage unit 104.

Figure 2:
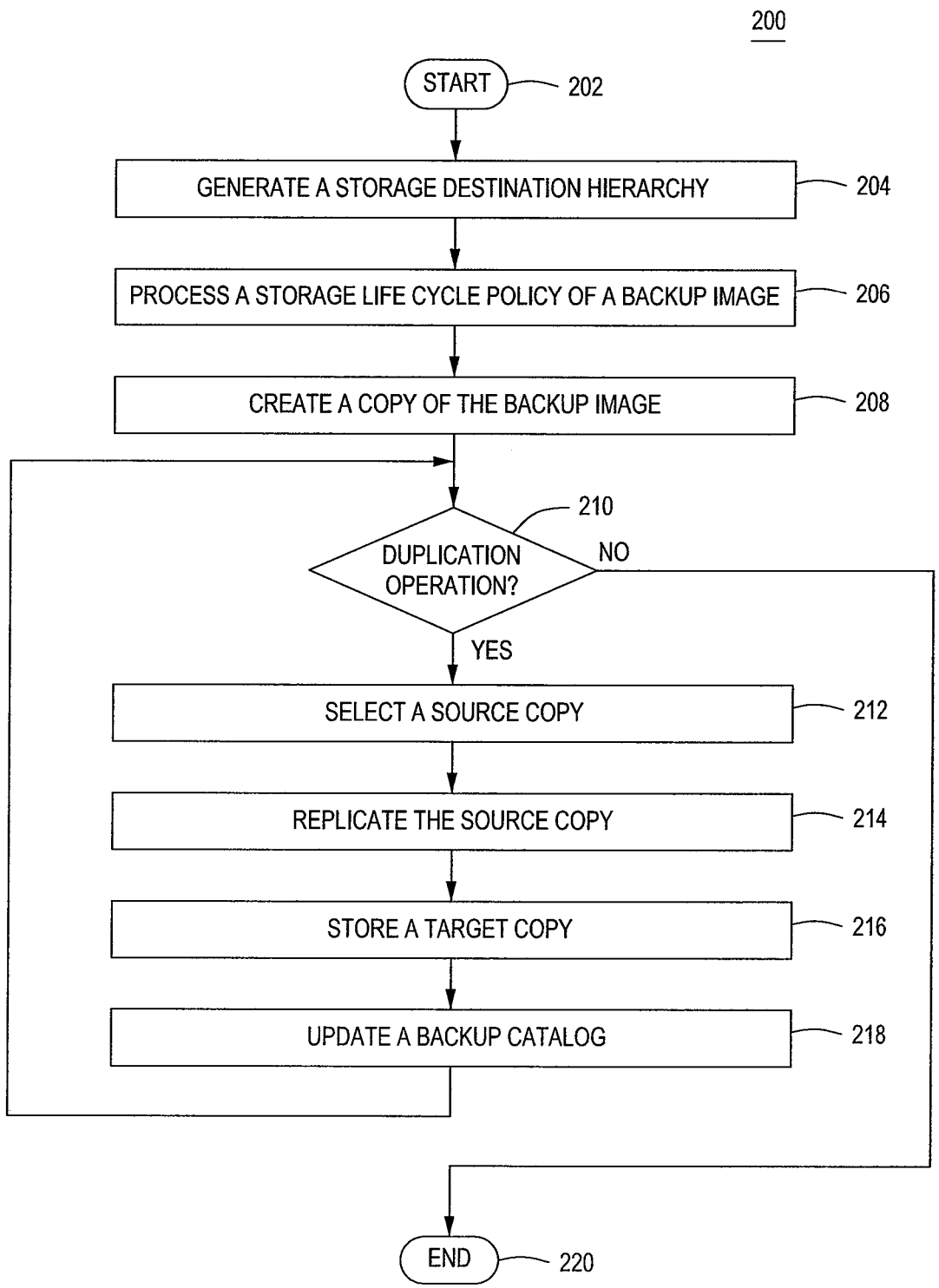
FIG. 2 is a flow diagram of a method for maintaining a storage destination hierarchy according to one embodiment of the present invention.

FIG. 2 is a flow diagram of a method 200 for maintaining a storage destination hierarchy according to one embodiment of the present invention. The method 200 begins at step 202 and proceeds to step 204.

At step 204, a storage destination hierarchy (e.g., the storage destination hierarchy 118 of FIG. 1) is generated. At step 206, a storage lifecycle policy is processed. At step 208, a copy of the backup image is created. At step 210, a determination is made as to whether a duplication operation is to be performed. If the duplication operation is to be performed, the method 200 proceeds to step 212. If the duplication operation is not to be performed, the method 200 proceeds to step 220 where the method 200 ends. At step 212, a source copy is selected. At step 214, the source copy is replicated. At step 216, a target copy is stored. At step 218, hierarchy backup catalog is updated and the method 200 returns to step 210. At step 220, the method 200 ends.

Figure 3:
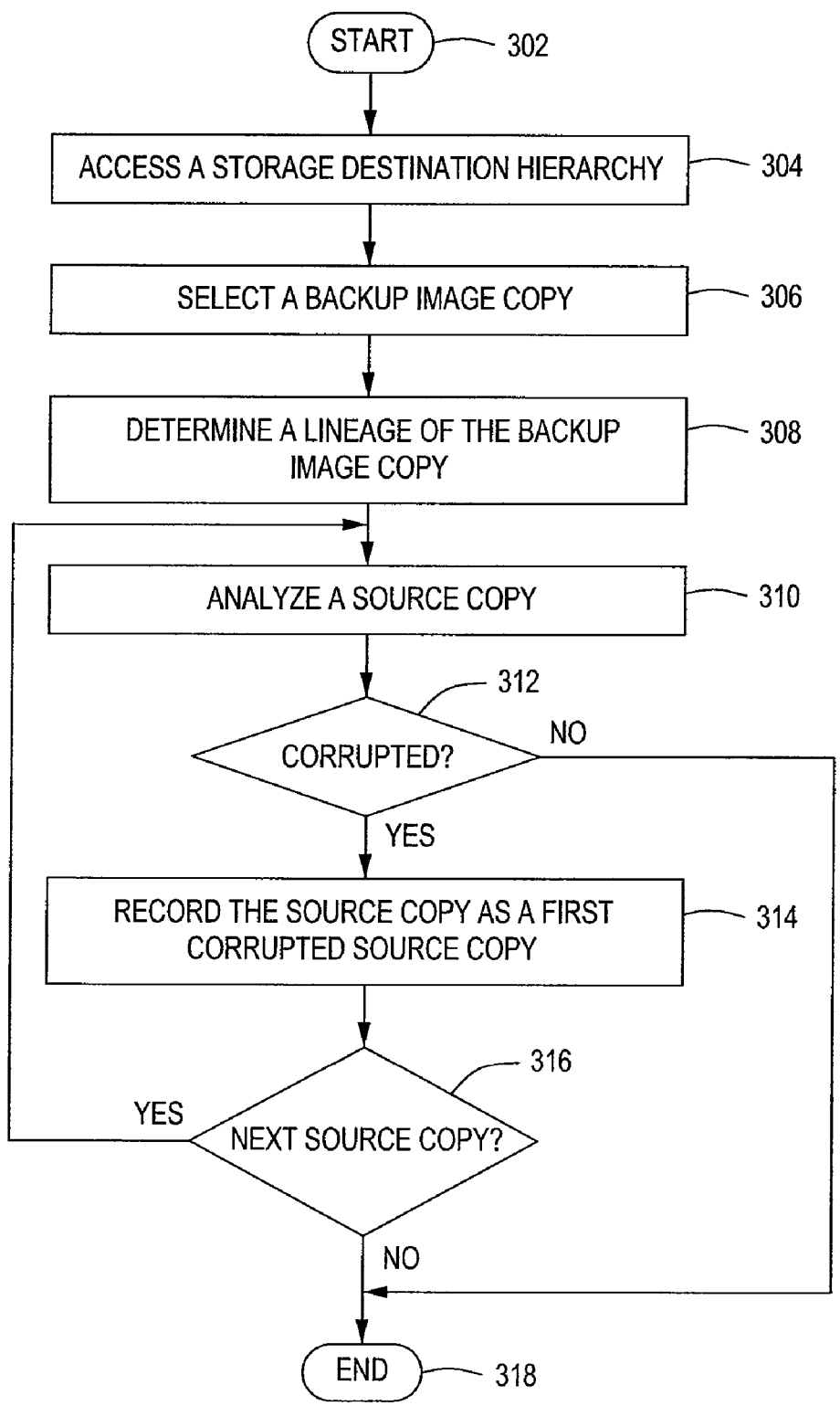
FIG. 3 is a flow diagram of a method for detecting a malfunction and/or an attack associated with a backup image copy according to one embodiment of the present invention.

FIG. 3 is a flow diagram of a method 300 for detecting a corrupted source copy associated with a backup image copy according to one embodiment of the present invention. The method 300 begins at step 302 and proceeds to step 304.

At step 304, a storage destination hierarchy is accessed. At step 306, a backup image copy is selected. In one embodiment, a storage administrator specifies the backup image copy to analyze because the backup image copy includes corrupted data. Furthermore, the backup image copy may be associated with a malfunction (e.g., a storage device malfunction, replication malfunction and/or the like) or a security attack (e.g., malicious data). At step 308, a lineage of the backup image copy is determined. At step 310, a source copy is analyzed.

At step 312, a determination is made as to whether there is the source copy is corrupted. If it is determined that the source copy is not corrupted, the method 300 proceeds to step 318. If it is determined that the source copy is corrupted, the method 300 proceeds to step 314. At step 314, the source copy is recorded as a first corrupted source copy. At step 316, a determination is made as to whether there is a next source copy. If it is determined that there is a next source copy, the method 300 returns to step 310. If it is determined that there is no next source copy (e.g., in a lineage of the backup image copy), the method 300 proceeds to step 318. At step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for using a storage destination hierarchy to manage a storage lifecycle of a backup image, comprising:
   specifying at least one source copy for at least one storage lifecycle operation in a storage lifecycle policy to generate a storage destination hierarchy using the at least one specified source copy; and
   performing the at least one storage lifecycle operation using the storage destination hierarchy;
   wherein the storage destination hierarchy comprises information regarding a hierarchy of storage destinations for respective lifecycle operations of the storage lifecycle policy;
   wherein the storage destination hierarchy comprises a mapping between the at least one source copy and a copy of the at least one source copy that was created in response to performing the at least one storage lifecycle;
   using the destination hierarchy to determine a lineage of the copy.

2. The method of claim 1, wherein specifying the at least one source copy further comprising:
   examining information regarding the storage destination hierarchy to identify at least one backup image copy that is managed by the storage lifecycle policy; and
   selecting a backup image copy of the at least one backup image copy as a source copy for a storage lifecycle operation of the storage lifecycle policy.

3. The method of claim 1 further comprising using the storage destination hierarchy to determine a lineage of a backup image copy.

4. The method of claim 3 further comprising analyzing the lineage of the backup image copy, wherein the backup image copy is corrupted.

5. The method of claim 4, wherein analyzing the lineage further comprises analyzing at least one source copy of the backup image copy to identify a first corrupted source copy.

6. The method of claim 1 further comprising updating a backup catalog with the source copy for the storage lifecycle operation.

7. The method of claim 1 further comprising performing a duplication operation on the source copy.

8. The method of claim 1, wherein specifying the at least one source copy further comprises processing an instruction from a storage administrator, wherein the instruction specifies the backup image copy to be the source copy for the storage lifecycle operation.

9. The method of claim 1 further comprising:
   replicating the source copy to a storage unit; and
   storing a target copy in the storage unit.

10. An apparatus for using a storage destination hierarchy to manage a storage lifecycle of a backup image, comprising:
    a memory comprising a storage destination hierarchy, wherein the storage destination hierarchy indicates at least one source copy for at least one storage lifecycle operation as defined by a storage lifecycle policy; and
    a manager for defining the storage destination hierarchy and performing the at least one storage lifecycle operation using the at least one source copy;
    a lineage module for determining a lineage of a backup image copy, wherein the lineage of the backup image copy comprises at least one source copy associated with the backup image copy;
    wherein the storage destination hierarchy comprises information regarding a hierarchy of storage destinations for respective lifecycle operations of the storage lifecycle policy;
    wherein the storage destination hierarchy comprises a mapping between the at least one source copy and a copy of the at least one source copy that was created in response to implementing the at least one storage lifecycle.

11. The apparatus of claim 10, wherein the manager processes information from a storage administrator, wherein the information specifies the backup image copy as the source copy.

12. The apparatus of claim 10, wherein the lineage module identifies the at least one source copy for the backup image copy using the storage destination hierarchy.

13. The apparatus of claim 10, wherein the lineage module examines the at least one source copy to detect a malfunction.

14. The apparatus of claim 10, wherein the lineage module examines the at least one source copy to identify a source copy having corrupted data.

15. The apparatus of claim 14, wherein the lineage module removes the identified source copy from a storage unit.

16. A computer readable medium comprising instructions, wherein method is implemented in response to executing the instructions, the method comprising:
    specifying at least one source copy for at least one storage lifecycle operation in a storage lifecycle policy to generate a storage destination hierarchy using the at least one specified source copy; and
    performing the at least one storage lifecycle operation using the storage destination hierarchy;

wherein the storage destination hierarchy comprises information regarding a hierarchy of storage destinations for respective lifecycle operations of the storage lifecycle policy;

wherein the storage destination hierarchy comprises a mapping between the at least one source copy and a copy of the at least one source copy that was created in response to performing the at least one storage lifecycle;

using the destination hierarchy to determine a lineage of the copy.

17. The computer readable medium of claim 16 wherein the method further comprises using the storage destination hierarchy to determine a lineage of a backup image copy.

18. The computer readable medium of claim 17 wherein the method further comprises analyzing the lineage of the backup image copy, wherein the backup image copy is corrupted.

19. The method of claim 5 further comprising removing the first corrupted source copy from a backup catalog, the storage lifecycle policy, and the storage destination hierarchy.

20. The apparatus of claim 14 wherein the lineage module removes the source copy having corrupted data from a backup catalog, the storage lifecycle policy, and the storage destination hierarchy.

* * * * *